United States Patent Office 3,383,656
Patented May 14, 1968

3,383,656
ALTERNATE SYNCHRONIZATION DEVICE FOR TWO ROTATING SWITCHES
Jean Lavergne, Epinay-sur-Orge, France, assignor to CIT—Compagnie Industrielle des Telecommunications, Paris, France
Filed Oct. 7, 1963, Ser. No. 314,440
Claims priority, application France, Oct. 9, 1962, 911,691
3 Claims. (Cl. 340—147)

ABSTRACT OF THE DISCLOSURE

In an assembly comprising two rotating commutators having a plurality of switch positions identified by corresponding addresses, one of which rotates at its operating speed while the other one is started when the positions of said two commutators have identical orientations with respect to a reference position by means of a logical circuit having two inputs which receives on one input thereof the numerical information being characteristic of the instantaneous position of said first commutator and on the other input thereof the numerical information being characteristic of the position of said commutator. The numerical data is furnished by a logical element wired so as to be integral with each position of each commutator.

---

The present invention relates to a device which assures the start or energization of a first rotating commutator, whose shaft may be controlled by a motor, in synchronism with the position of another identical rotating commutator which rotates at the operating speed thereof, particularly in the case in which the two rotating commutators comprise rows of contacts being uniformly distributed over the periphery of a rotor, each row of contacts corresponding to a specific position of the commutator.

There are devices known in the art, such as disclosed in U.S. Patent 3,155,955, which make possible a comparing of the phases of two rotating shafts. A device is also disclosed in U.S. Patent 2,970,302, which makes it possible to correct the phase of one rotating shaft with respect to another rotating shaft; the two shafts may be arranged at any desired distance with respect to each other and are connected by means of a single transmission path. In addition, U.S. Patent 3,278,931, discloses a device which provides for the energization of a rotating commutator in synchronism with the phase of another commutator already started or energized and placed in proximity thereto.

The devices disclosed in the prior art accomplish their objectives by the use in each rotating commutator of a potentiometer having multiple taps respectively connected to one contact of each row of contacts, constituting a voltage divider upon energization by means of a direct current source, and wherein the motor of the commutator in the position of rest is started when the two voltages are equal.

This known type of device has drawbacks particularly by reason of the fact that, in an instance in which the number of positions is large, for example larger than 100, the construction of the resistances entering into the composition of the voltage divider is very expensive because of the precision necessary therefor.

The present invention, therefore, has the object of providing a synchronized starting or energizing device which is simple in construction, sturdy and inexpensive.

It consists essentially in a system or connection comprising a rotating commutator being engaged and a rotating commutator being stopped, which utilizes for each position of a rotating commutator movable contact studs or pieces being connected to a continuous current source V in such a manner as to constitute the code signal of the position in binary code with 0 corresponding to zero volt and $2^n$ corresponding to V volts, and which conveys the two codes originating from one position of each of the commutators to the input of a logical element by means of fixed or stationary contacts, this logical element supplying a signal for the energization of the commutator being stopped.

The present invention will now be further described hereinafter with reference to the accompanying drawings, wherein.

Figure 1:
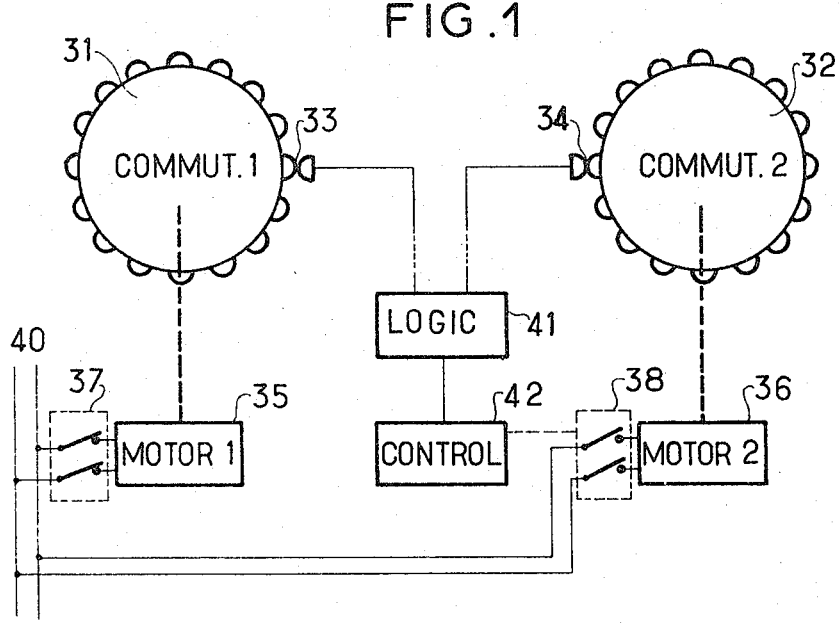
FIGURE 1 illustrates schematically the general arrangement of a synchronized energizing device according to the present invention.

In FIGURE 1, a first rotating commutator 31 comprises rows of studs or contacts uniformly distributed over the periphery of the rotor. Only a single stud or contact has been shown in each longitudinal row but, in actual fact, several of these are present and are aligned in a direction perpendicular to the plane of the figure. Each row of movable studs or pieces comes successively into contact with one row of fixed or stationary studs shown at 33.

This commutator is controlled by a motor 35 which is supplied with energy or power from a supply line 40 by a contactor 37 which is assumed to be closed.

A rotating commutator 32 is constructed in precisely the same manner as the commutator 31 with movable studs or contacts, a row of fixed or stationary studs or contacts 34, a motor 36 supplied from the line 40 by a contractor 38 which is open at the start of operations.

A logical element 41 receives on an input thereof numerical code informations or data being transmitted by the studs or contacts 33 and on another input thereof numerical code informations or data being transmitted by the studs or contacts 34. Each connection of a parallel type is assured by means of several lines, which has been symbolized in the drawing by small dashed lines. When there is coincidence between the code signals, indicating that the codes derived from the two commutators are identical, the logical element orders the engagement of the motor 36 by means of the control element 42 and the contactor 38.

Figure 2:
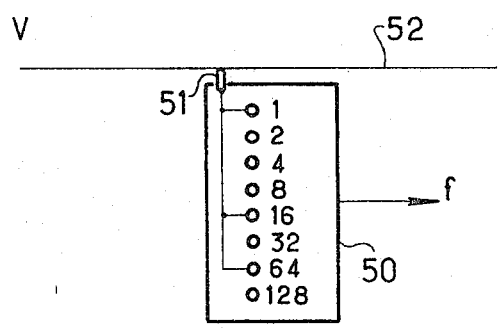
FIGURE 2 illustrates a diagram of one member of the apparatus according to the present invention.

FIGURE 2 is a schematic view in an expanded form of a row of contacts on one commutator which serve for constituting the code signal of one position. These contacts being contained in an insulating box 50 at the periphery of the rotor of a contactor rotating in the direction of the arrow $f$ are disposed in a binary series, for example, having eight contacts. The box comprises a supplementary stud or contact 51 which assures a sliding contact with a conductor 52 carried at a potential V. The code signal studs or contacts are connected to the stud or contact 51 as a function of the row of the code signal expressed in a binary numeration. For example, in the case shown in FIGURE 2, the code signal is 81.

Figure 3:
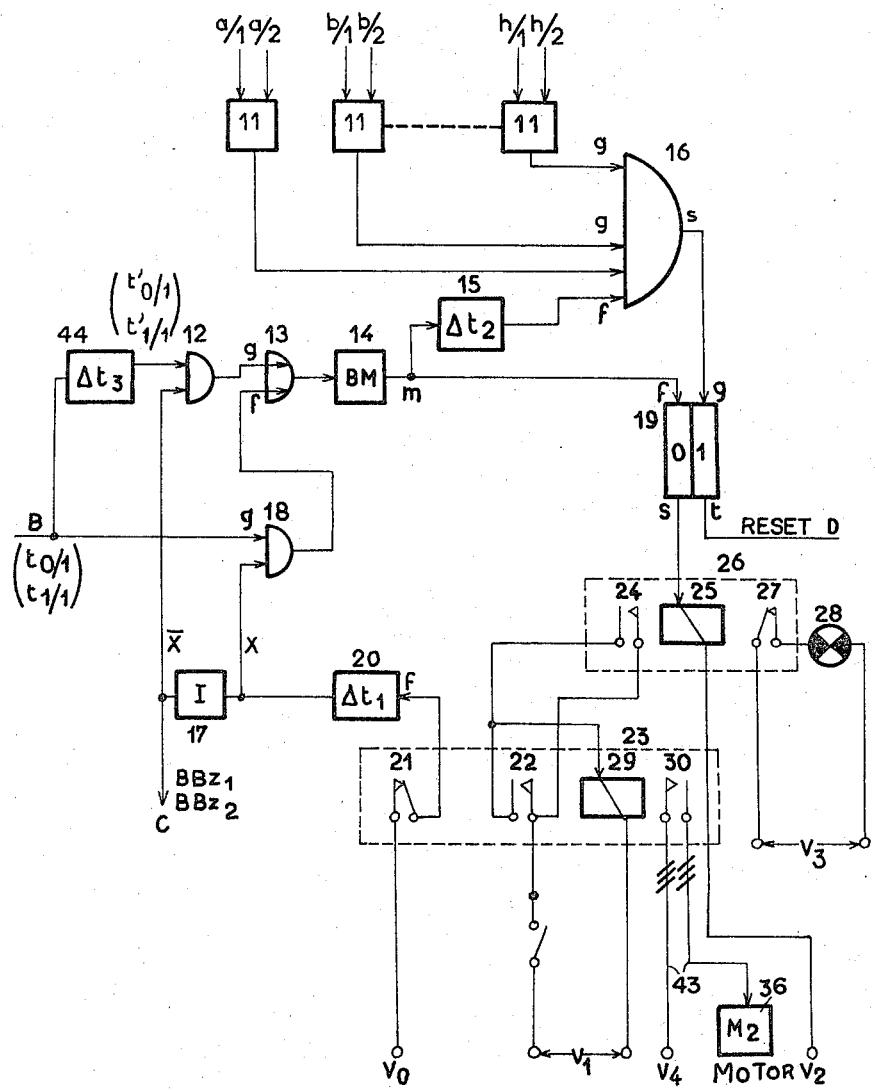
FIGURE 3 shows a detailed diagram of logical circuits present in the device as proposed by the present invention.

The device shown in FIGURE 3 of the drawing includes eight "EXCLUSIVE OR" circuits 11 which receive through two input circuits each of the eight binary digits which constitute the arm position code or address of each commutator, $a/1$ and $a/2$, $b/1$ and $b/2$ ... $h/1$ and $h/2$, one input being supplied by the No. 1 commutator and the other by the No. 2 commutator. The output logical signals from the circuits 11 are applied to the eight input terminals g of an And-circuit 16. If every pair of binary digits is equal, i.e., $a/1=a/2$, $b/1=b/2$ ... $h/1=h/2$, both code numbers are identical (in this case only) and signals having a logical value of "1" are supplied to every input of circuit 16 from the circuits 11. Under these conditions, a pulse applied to the input terminal (f) of circuit 16 will be transmitted to the output s and, from there, to the input g of a bistable flip-flop 19 as a control pulse. The flip-flop 19 is connected to the coil 25 of a relay 26 which controls the No. 2 commutator motor 33.

When the energizing button of the No. 1 commutator (not shown) is depressed, a reset singal is applied through input D to the flip-flop 19, which zero reset. The relay 26 is not energized and its contact 24 is open. In the contactor 23 of the No. 2 commutator motor 33, the contact 30 is also open, this cuts the power supply of the motor 33 off through the three phased circuit 32, hence, this motor is not energized when the No. 1 commutator is being energized.

Figure 4:
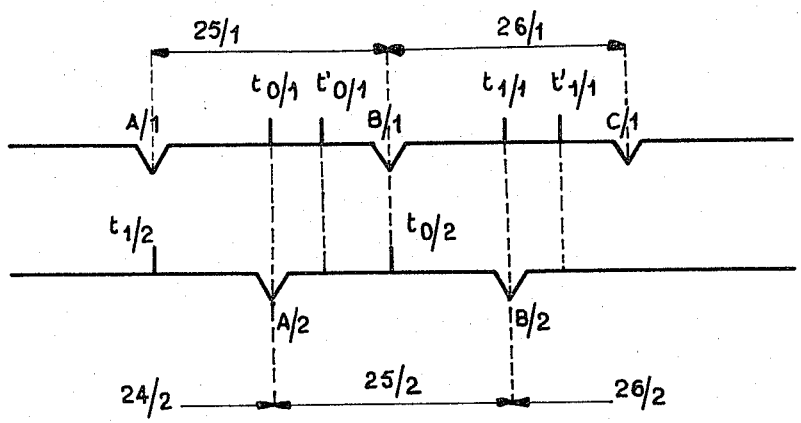
FIGURE 4 shows a timing diagram necessary for understanding the operation of the device proposed by the present invention.

At the same time a DC voltage Vo is transmitted through the contact 21 of the contactor 23 to a delay circuit RC 20. A logical signal X is supplied by that circuit, which is supplied to an And-circuit 18 and to an inverter 17 which supplies a signal $\overline{X}$. Under the described conditions, $X=1$ and $\overline{X}=0$. Consequently, the And-circuit 18 is closed, an And-circuit 12 connected to the inverter 17 is open. At the same time, a signal the logical value of which $\overline{X}=0$ is supplied through a terminal C to the bistable flip-flops $BBZ_1$ and $BBZ_2$ of the accurate adjusting device which stops for the moment the operation of this device, as seen in FIGURE 4 of applicants Patent No. 3,278,931.

As the And-circuit 18 is closed, the control pulses $t_{0/1}$, $t_{1/1}$ which are suppied to this circuit through the input terminal g are transmitted to the input terminal f of an Or-circuit 13. This circuit is not supplied through its input terminal g as the And-circuit 12 is locked. Pulses supplied by the Or-circuit 13 are transmitted to a monostable flip-flop 14 which operates as a pulse generator. From the output m of the monostable flip-flop 14, the pulses are supplied to the input terminal f of the bistable flip-flop 19 for the purpose of confirming the zero value on the output terminal s of this flip-flop.

The pulses supplied by the monostable flip-flop 14 are also supplied to a delay $\Delta t2$ circuit 15 (delay equal to 4 μs. in the described example). The delayed pulses are supplied to the f input terminal of the And-circuit 16. If both code signals supplied by both commutators are identical, the pulse is transmitted through the output s of the circuit 16 to the input terminal g of the bistable flip-flop 19. In this case, the realy 26 is energized through the $V_2$ voltage supply source. The contact 24 of the relay 26 closes, the coil 29 of the contactor 23 is energized by a $V_1$ supply source. The contact 21 opens and the contact 22 closes. At the same time the contact 30 closes and the No. 2 commutator motor 33 is energized through a $V_4$ power supply source.

The purpose of the contact 22 in its closed position is to keep the coil 29 energized and contact 30 closed even when contact 24 is open.

As the $V_0$ power supply is cut off at the input terminal of the delay circuit 20, through the opening of the contact 21, after a delay equal to $\Delta t1$ (one second for example), the logical signal X is invented and becomes $X=0$; in this case, the inverter 17 supplies $\overline{X}=1$. As a result, as And-circuit 18 is opened, And-circuit 12 is closed.

The signal transmitted now by And-circuit 12 to Or-circuit 13 for unlocking And-circuit 16 is outphased in relation with signals $t_{0/1}$ and $t_{1/1}$ previously used. Effectively, the lapse of time required for the motor 33 synchronism operation is about 100 μs. It is, then, an advantage that the start signal should be transmitted at a time such as $t0/1$ or $t1/1$: in this case the No. 2 commutator has all the time required to reach its operating speed while the No. 1 commutator remains stationary. On the other hand, when both commutators are operating, the code signals must be checked for a previous moment. This can be seen straight away on the FIGURE 4 diagram. Within the lapse of time $A/1$, $B/1$, the No. 1 commutator is supposed to occupy the position 25/1. The No. 2 commutator is on the position 25/2 during the period of time $A/2$, $B/2$. The most favorable moment to compare code signals is the time $t'_{0/1}$ outphased by 100 μs. in relation with $t_{0/1}$ or $t'_{1/1}$ outphase by 100 μs. in relation with $t_{1/1}$. This is the reason why, by a very well known delay circuit 34, the signals $t_{0/1}$ and $t_{1/1}$ applied to the input terminal f of the And-circuit 12 are delayed by a delay $\Delta t3$ and become the test signals $t'_{0/1}$ and $t'_{1/1}$.

If code signals are identical at the testing moment, instant $t'_{0/1}$ or $t'_{1/1}$, the flip-flop 19 zero set by the signal supplied to its input terminal f, is reset on position 1 by a signal supplied to its input terminal g 4 μs. later (test signal).

Considering the energizing time in the coil of the relay 26, the latter is practically permanently energized. The contact 27 is open, and, the check light 28 which is not supplied at this moment by the $V_3$ power supply source, is off.

If, due to a faulty operation of the device, the synchronism between both commutators is not obtained, the warning light 28 comes on. In this case the motor 36 is manually switched all through the switch connecting source $V_1$ to contactor 23. When this switch is released, the automatic energizing operation starts all over again.

This invention is primarily applicable to the situation when it is necessary to associate two commutators in order to double the searching power of each commutator. This case particularly applies when considering a recurrent searching device of an assembly meant for the operation of a nuclear center. This device can be found in a reactor using uranium bars. Each bar temperature must be periodically coded in the form of digits to be stored in a magnetic core matrix.

As each bar is located by its address (storage case number in which is recorded its temperature in the form of digits) in order to have the storage case bearing its number, it is compulsory for both commutator arms to have synchronised alternate displacements, the angular position of the No. 2 commutator arm, for instance, is the same as the position the No. 1 commutator arm occupies at this special moment.

When the No.1 commutator has started, the No. 2 commutator must be started when the relative position of both arms is correct. As the driving motors are of the synchronous type, the synchronism must be normally maintained.

The position of each commutator arm is identified by a numerical address. The No. 2 commutator is started after the No. 1 commutator when the position addresses of both arms are identical.

If, for an unexpected reason, the synchronism is lost and, the position adddesses of both arms do not match each other anymore, the device actuates the corresponding controls to delay the commutator which has gained on the other one.

I claim:
1. System for the synchronization of first and second rotating switches, each having a plurality of corresponding positions identified by their numerical addresses including means for producing signals for each position on each switch representing said addresses, comprising:
first means driving one of said switches in rotation,
coincidence means for comparing the position addresses
    on said one rotating switch with one position address
    on said other switch,
bi-stable control means responsive to said coincidence
    means for effecting operation of said other switch upon detection of coincidence between detected addresses on said first and second switches, said coincidence means including a plurality of first gates each receiving a corresponding bit of the addresses derived from said first and second switches and providing an output when the compared bits are alike, and an AND gate connected to the output of each of said first gates and having a signal control terminal, said AND gate providing a control output to said bi-stable control means, said bi-stable control means including a bi-stable flip-flop device, second means for driving said other switch in rotation, and relay control means for actuating said second means only in response to switching of said flip-flop device to a control state by said control output, timing means for controlling the operation of said coincidence means including a first delay circuit connected to the control terminal of said AND gate, a second delay circuit, and control means connecting said second delay circuit in series with said first delay circuit in response to actuation of said relay control means.

2. The system defined in claim 1 wherein said control means includes second and third AND gates and an OR gate connecting said second and third AND gates to said first delay circuit, timing signal means connected directly to said second AND gate and connected through said second delay circuit to said third AND gate, and third means for actuating said second AND gate and de-actuating said third AND gate in response to actuation of said relay control means.

3. The system defined in claim 2 wherein said third means includes a third delay circuit selectively connected to a voltage source by said relay control means and an inverter circuit connected to the output of said third delay circuit for controlling said third AND gate, the output of said third delay circuit being also connected in control of said second AND gate.

References Cited

UNITED STATES PATENTS

| | | | |
|---|---|---|---|
| 2,909,769 | 10/1959 | Spaulding | 340—146.2 |
| 2,970,302 | 1/1961 | Gridley | 340—271 |
| 3,011,150 | 11/1961 | Ketchledge | 340—146.2 |
| 3,078,404 | 2/1963 | Dumaire | 318—20.310 |
| 3,105,927 | 10/1963 | Flatten et al. | 318—20.310 |
| 3,155,955 | 11/1964 | Davidson et al. | 340—268 |
| 3,219,895 | 11/1965 | Price | 318—20.310 |
| 3,278,931 | 10/1966 | Lavergne | 340—268 |

JOHN W. CALDWELL, *Primary Examiner.*

THOMAS B. HABECKER, *Examiner.*

D. J. YUSKO, *Assistant Examiner.*